Dec. 13, 1949     W. L. TANCRED     2,491,398
CONTOURING MACHINE

Filed Nov. 14, 1946     5 Sheets-Sheet 1

INVENTOR.
William L. Tancred
BY Wright, Brown, Quinby & May
Attys.

Dec. 13, 1949     W. L. TANCRED     2,491,398
CONTOURING MACHINE
Filed Nov. 14, 1946            5 Sheets-Sheet 3

INVENTOR.
William T. Tancred
BY Wright Brown Quimby & Nay
Attys.

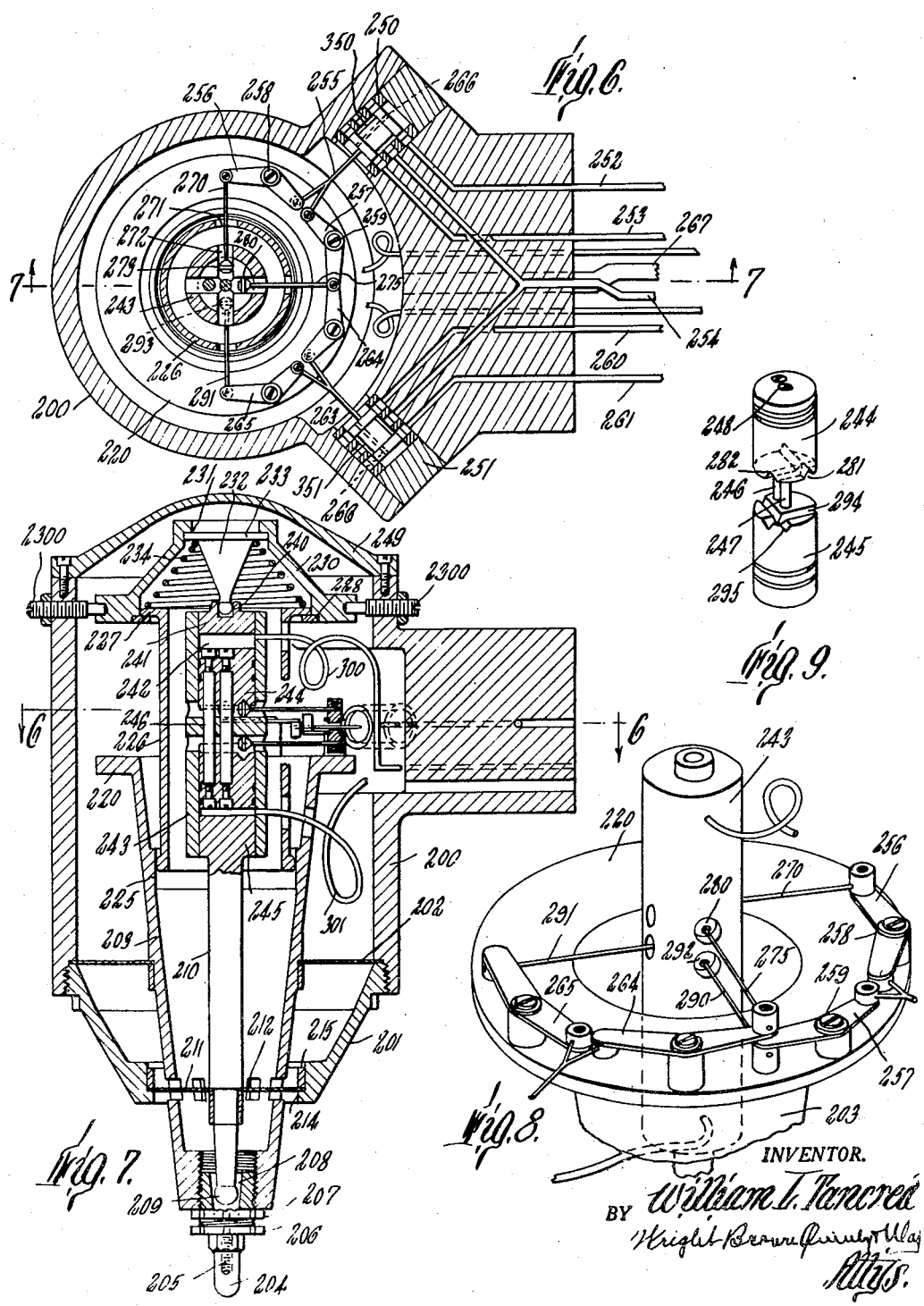

Inventor
William L. Tancred
by Wright, Brown, Quimby & May
Attys.

Patented Dec. 13, 1949

2,491,398

UNITED STATES PATENT OFFICE 2,491,398

CONTOURING MACHINE

William L. Tancred, Springfield, Vt., assignor to Jones & Lamson Machine Company, Springfield, Vt., a corporation of Vermont Application November 14, 1946, Serial No. 709,892

10 Claims. (Cl. 51—100)

This invention relates to the forming of a contour on a work piece in accordance with the contour of a controlling templet or pattern, and particularly where the work cutting is accomplished by a grinding operation.

One object of this invention is to make possible in one machine automatic repetitive tracings of the pattern selectively in either clockwise or counterclockwise direction, or in a reciprocal path, that is, retracing a contour path on a templet.

A further object is to provide such a machine in which either a rotatable pattern or a flat templet may be made used for control purposes.

Still another object is to provide mechanism for automatically compensating for dressing error of the wheel truing device.

A further object is to provide selectively for either manual or automatic control of the depth of grinding.

Another object is to provide for automatic stopping of the machine at the end of the finish grind.

Further objects and advantageous constructions will appear from a description of certain embodiments of the invention shown in the accompanying drawings in which Figure 1 is an isometric view of a machine embodying the invention.

Figure 6 is a sectional view of the tracer mechanism on line 6—6 of Figure 7.

Figure 7 is a sectional view on line 7—7 of Figure 6.

Figure 8 is a fragmentary inverted perspective view of a portion of the tracer mechanism.

Figure 9 is a perspective view of certain elements of the tracer mechanism shown in vertical section in Figure 7.

Figure 10:
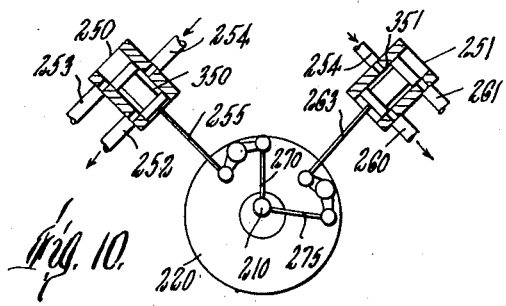
Figure 11:
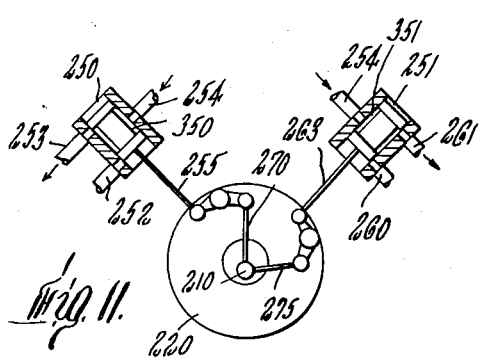
Figure 15:
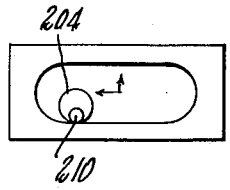
Figure 12:
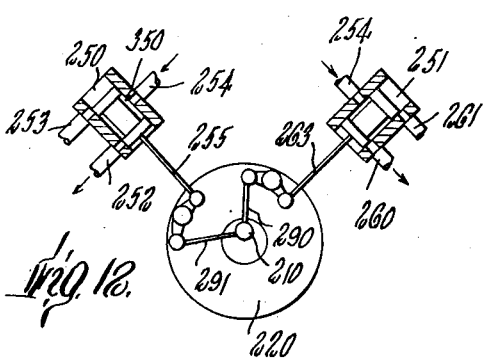
Figure 16:
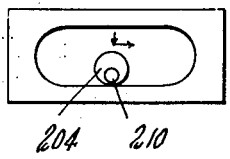
Figure 13:
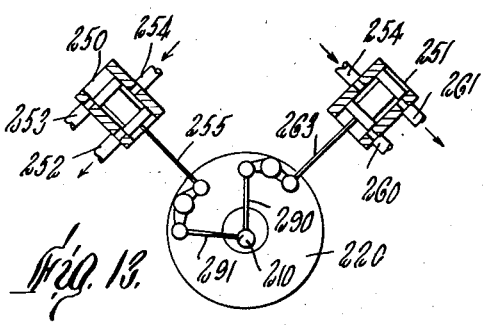
Figure 17:
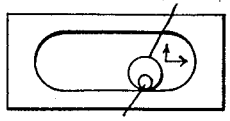

Figures 10 to 13, inclusive, are somewhat diagrammatic views showing relationships between the tracer elements and valves, Figures 10 and 11 showing such relationships for counterclockwise tracing with certain linkages effective, and Figures 12 and 13 showing similar relationships for clockwise rotation, with the other linkages effective.

Figures 14 to 17, inclusive, are diagrammatic views showing the directions of motion of the tracer mechanism relative to the pattern corresponding to the valve positions of Figures 10 to 13, respectively.

Figure 1:
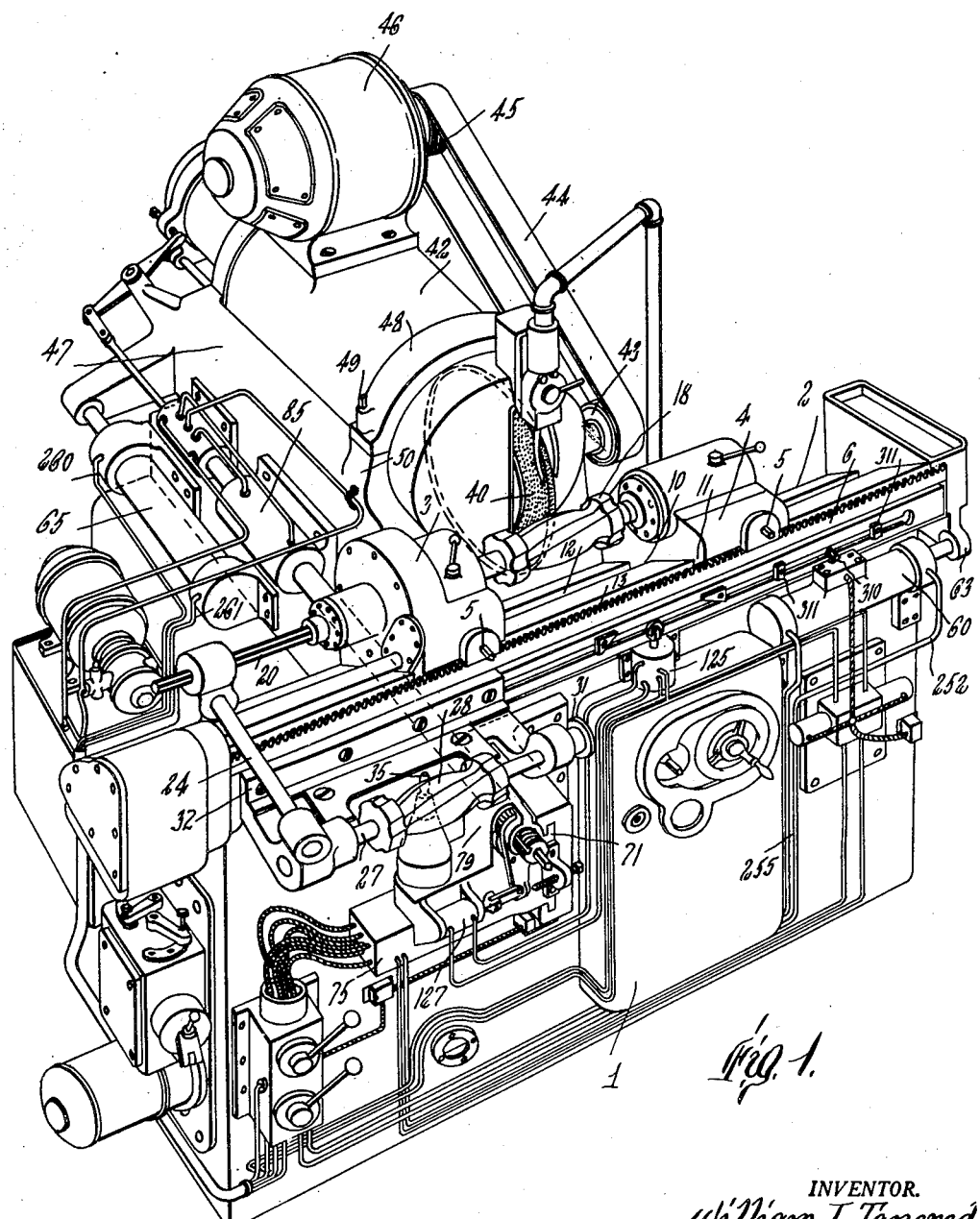
Figure 2:
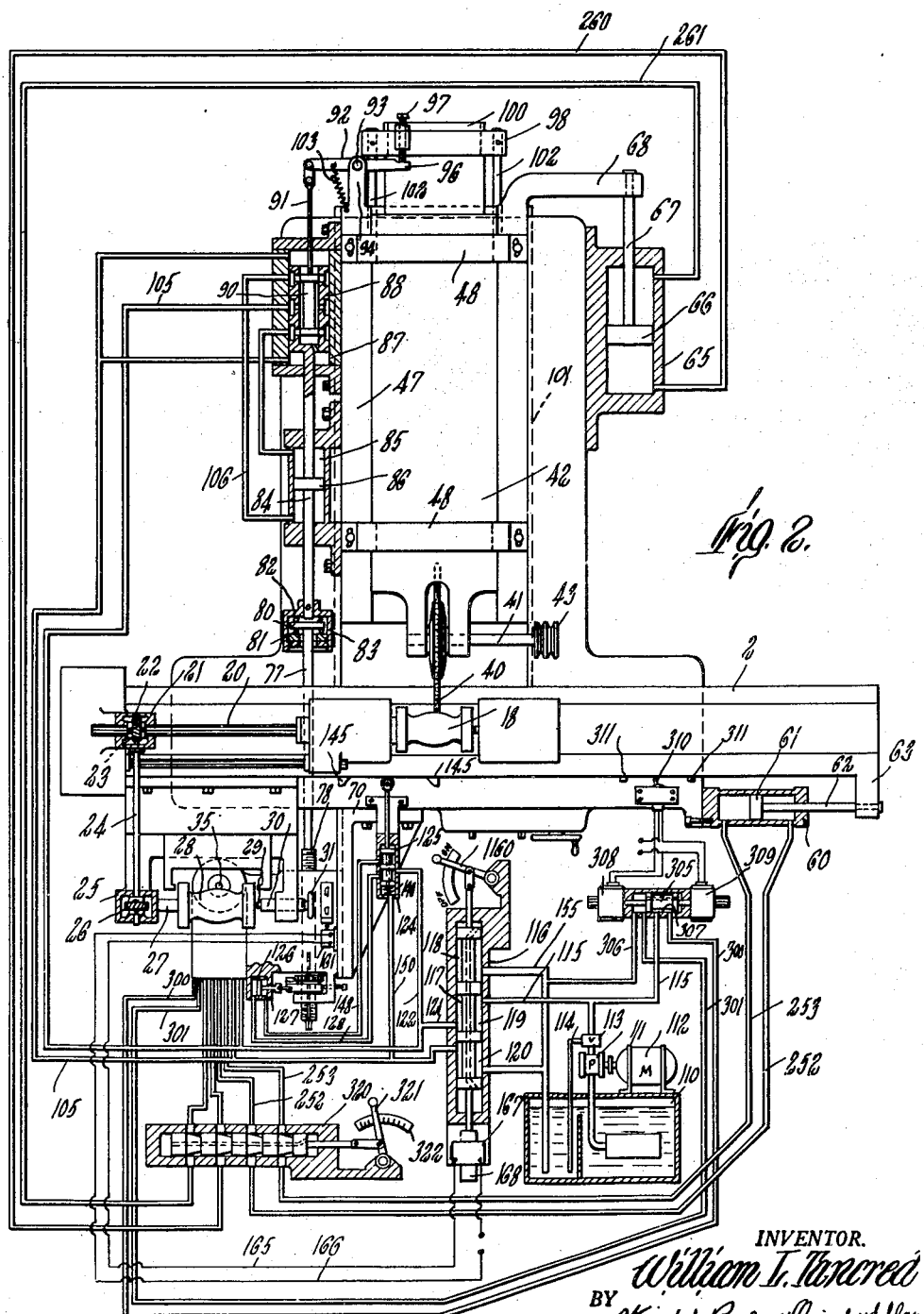
Figure 2 is a somewhat diagrammatic vertical sectional view subtantially centrally lengthwise of the work table.
Figure 4:
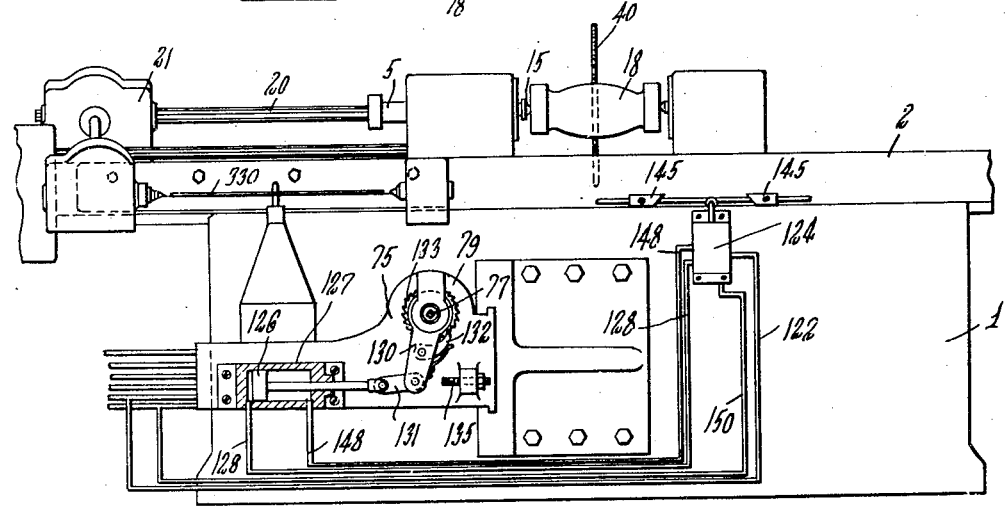
Figure 4 is a fragmentary view, partly in front elevation and partly broken away and in section.

Referring first to Figures 1, 2 and 4, the machine comprises a base 1 on which is mounted for traversing motion a work supporting carriage 2, which supports thereon a headstock 3 and a tailstock 4. These stocks are adjustable lengthwise on the carriage 2, and for this purpose they may be provided with suitable pinions on shafts 5 having polygonal forward ends to which a suitable tool (not shown) may be applied, and by which the shafts 5 may be turned. The pinions carried by these shafts mesh with teeth of a rack bar 6 extending along the forward edge of the carriage 2. The head and tailstocks are provided with suitable guide elements 10 and 11 which cooperate with grooves 12 and 13, respectively, thus to guide the head and tailstocks for linear adjustment.

The headstock 3 may be provided with a spindle 15 carrying a live center and a dog 16 (Figure 3) for driving connection with a pin 17 projecting from the work piece 18 which is supported between the centers of the head and tailstocks. The spindle 15 extends through the head end of the headstock 3 and has coupled thereto a splined shaft 20 which extends slidably through a gear casing 21. Within this gear casing a spiral gear 22 (Figure 2) held against axial motion by the end walls of the casing 21 is splined to the shaft 20, and in engagement with this spiral gear 22 (Figure 2) is a similar gear 23 on a forwardly projecting shaft 24. The forward end of the shaft 24 extends into a gear casing 25 within which there is secured to the shaft 24 a spiral gear 26 which meshes with a similar gear on a shaft 27 to which is suitably secured the rotary pattern 28. The opposite end of this pattern is supported as by a dead center 29 carried by a tailstock 30 which is adjustable axially, as by rotation of a hand wheel 31 in a well known manner. The shaft 27 is journaled in a bracket 32 secured to the forward face of the work carriage 2. Thus the work piece 18 and the pattern 28 are rotated in unison, and both are movable axially with the carriage 2. A tracer mechanism having a pattern-engaging feeler 35 moves forwardly and backwardly in time with the relative feed motion of the work piece 21 and the cutting tool, which, as shown, is a grinding wheel 40. This grinding wheel is mounted for rotation on a shaft 41 carried on a cylindrical member 42 mounted for angular adjustment about its axis in a slide 47. One end of the shaft 41 may be provided with a belt pulley 43 over which may be passed a belt 44 which also engages a drive pulley 45 of a driving motor 46 which is carried by the member 42. The member 42 is angularly adjustable within the slide 47, the direction of motion of this slide being transverse to that of the carriage 2. The member 42 is secured to the slide 47 adjacent to opposite ends by caps 48 extending over its top face and secured at their ends as by screws 49 to suitable ears 50 on the side walls of the slide 47.

It will be noted that the traversing motion between the grinding wheel 40 and the work piece 18 is produced by axial motion of the work piece, while the feed and retractive motion of the tool is produced by axial sliding motion of the slide 47 and thus of the grinding wheel. The axial motion of the tracer feeler 35 along the pattern is effected by motion of the pattern and not the tracer, and the in and out relative feed motion is produced by corresponding backward and forward motion of the tracer with the wheel 40.

The traverse motion of the carriage 2 is produced by an hydraulic motor, the cylinder 60 of which, as shown in Figure 2, having a piston 61 therein connected through a piston rod 62 to an extension 63 of the carriage 2.

The forward and backward motion between the tool 40 and the work piece and between the tracer and pattern is produced by a second hydraulic motor comprising the cylinder 65, which in the diagram of Figure 2 is shown on the opposite side of the grinding wheel from its showing on Figure 1, within which is slidable the piston 66 connected through a piston rod 67 to an arm 68 secured to the slide 47.

The traverse motion hydraulic motor 60 and the backward and forward motion motor 65 are controlled in suitable timed relation and by the action of the tracer mechanism as it and the pattern are relatively moved, the control being continuous when once started and selectively in either clockwise or counterclockwise direction and at an adjustable speed.

The backward and forward motion of the tracer mechanism is produced by the motion of the slide 42, and for this purpose, the bed has fixed to its forward face an angle bracket 70 having a longitudinally extending way 71 in one side face within which is slidably mounted a tracer carriage 75. This tracer carriage is by this mounting permitted a motion at right angles to the carriage 2. This latter motion is accomplished by connection to the wheel slide 47, but in order that corrections may be made for wear and truing of the grinding wheel, these connections include further adjusting means. These connections include an axially movable and rotatable shaft 77 having its forward end portion threaded at 78, the threaded portion cooperating with an internally threaded post 79 of the tracer carriage 75. Rotary motion of the shaft 77 produces a corresponding feed or retracting motion to the grinding wheel and axial motion of the shaft 77 produces backward and forward motion and also the desired corrective effect. Rotation of the shaft 77 is produced by means which will later be explained.

The rear end of the shaft 77 is provided with a head 80 mounted between thrust ball bearings 81 and 82 of a coupling 83, this coupling being carried by a rod 84 which extends through a hydraulic cylinder 85 having a piston 86 secured thereto within this cylinder. This cylinder 85 is connected to and carried by the slide 47. The rod 84 continues into a valve chamber 87 where it carries a hydraulic valve sleeve 88.

Within the valve sleeve 88 is positioned a spool valve 90 connected through a link 91 to one arm of a lever 92. This lever 92 is fulcrumed at 93 on a post 94 carried by the slide 47, and its opposite end 96 is pressed against an adjusting screw 97 carried by a guide sleeve 98 carried by a cylindrical slide 100 slidable within and concentric to the cylindrical carrier 42. At its forward end this slide 100 carries a suitable truing device indicated in dotted lines at 101 arranged to true the grinding wheel 40 opposite to the point of contact between this wheel and the work 18.

This truing device may be of any suitable type, as, for example, of the general type shown in the Flanders et al. Patent No. 2,187,229, granted January 16, 1940, for Wheel Truing Mechanism, being carried by a cylindrical casing corresponding to the slide 100 and movable axially toward and from the grinding wheel. The sleeve 98 is provided with guide rods 102 axially slidable within the slide 47 and by which the abutment screw 97 is held in axial adjustment with the slide 42. A spring 103 engaging at one end with the lever 92, and at the other with a fixed portion of the slide 47, holds the end 96 of this lever into contact with the screw 97.

The parts are so arranged that whenever the truing device is moved forward to true the wheel, it correspondingly rocks the lever 92, pulling backwardly on the link 91 and so moving the spool valve 90 as to admit hydraulic pressure from the pipe 105 to the pipe 106 leading to the cylinder 85, forwardly of the piston 86. This moves the piston 86 rearwardly, pulling with it the shaft 77 and the tracer mechanism. As will later appear, this withdrawal motion of the tracer mechanism sets into action forward feed of the tracer mechanism and the wheel 40 through the hydraulic cylinder 65, thus adding a forward increment of motion to the grinding wheel equal to the amount trued off by the advance of the truing device. As soon as the piston 86 moves back sufficiently to shut off the fluid connection to the pipe 106, this corrective motion terminates.

The hydraulic mechanism which produces this corrective motion is common to the hydraulic mechanism which actuates the traverse and backward and forward motors comprising the cylinders 60 and 65, and as shown it comprises a supply tank 110 from which hydraulic fluid is drawn by the pump 111 driven by the motor 112, this pressure fluid passing through a limiting pressure relief valve 113 from which excess liquid passes back to the tank through the discharge pipe 114. The pressure liquid passing the valve 113 passes into the pipe 115 from which it passes into a valve casing 116. Within this valve casing 116 is a spool valve 117 having three cannelures 118, 119, and 120. In the position of the valve shown in Figure 2, the pressure pipe 115 leads into the cannelure 119 from which it passes out through the pipe 121. This is the "on" position of the valve, but by moving it to the "off" position through the control lever 116α, the cannelure 119 is cut off from the pressure supply pipe 115. From the pressure pipe 121 there leads off the pressure pipe 105, leading to the truing device corrective cylinder 87 as previously described.

Also communicating with this pipe 121 is a pipe 122 leading to a valve chamber 124 within which is a valve 125. This valve controls the passage of hydraulic pressure to one or the other side of a piston 126 in a cylinder 127, the reciprocation of which acts to rock the feed mechanism, imparting step by step rotation to the shaft 77, this causing a feeding motion of the grinding wheel.

Figure 5:
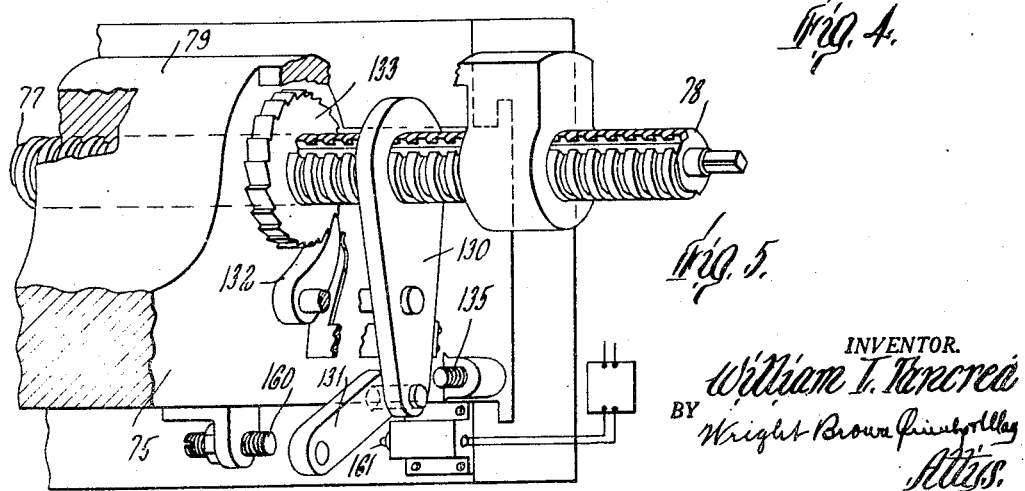
Figure 5 is a fragmentary perspective view of the feed actuating mechanism.

In the position shown in Figures 2 and 4, the fluid under pressure passes from the valve chamber 125 through the pipe 128, driving the piston 126 to the right as viewed in Figure 4, swinging a lever arm 130 connected thereto through a link 131 in a direction to cause a spring pressed dog 132 on a lever 130 to engage the ratchet wheel 133 keyed to the threaded portion 78 of the shaft 77. The extent of this motion is determined by the setting of a stop screw 135 which thus determines the extent of feed at each actuation (Figures 4 and 5). Whenever the valve 125 is moved in the reverse direction against the pressure of the spring 140, as by impingement on a cam follower of either of a pair of limit dogs 145 carried by the table 2 (Figure 2), the pressure pipe 122 is connected by this valve to the pipe 148 which returns the piston 126 to its left hand position, the pipe 128 then being connected by the valve 125 to the discharge passage 150. This discharge pipe 150 leads into the valve casing 116 and when the valve 117 therein is in "on" position, discharge continues by the valve 117 to the return pipe 155 which leads back to the supply tank 110.

At a predetermined limit of forward motion of the tracer, an adjustable abutment screw 160 on the tracer carriage contacts a switch 161, closing this switch, and closing the circuit between a pair of wires 165 and 166, in circuit with a solenoid 167, the energization of which draws a core 168 therein attached to the valve 117 and moves it to its "off" position, stopping the operation of the machine.

The tracer mechanism shown herein is quite similar to that which forms the subject matter of my patent application Serial No. 584,003, filed March 21, 1945, for Tracer mechanism, except that the present mechanism is capable of operating selectively either clockwise or counterclockwise, while the mechanism shown in my prior application is capable of operating in one direction only. This mechanism is shown in detail in Figures 6, 7 and 8, and for clarity, it is shown inverted in these figures from the position which it occupies in the machine as shown in Figures 1 to 4. It comprises a casing 200 having a cap 201 threaded into one end and acting as a partial closure therefor, this cap also retaining in position a flexible diaphragm 202, which at its inner end supports a tapered sleeve 203. This sleeve extends through an opening in the end of the cap 201 and at its free end it carries a pattern feeler 204. As these feelers may be differently contoured for cooperation with patterns of various kinds, it is shown as removably attached to the end of the sleeve 203, and as shown engages over a threaded element 205 projecting from a sleeve 206 threaded into the extremity of the sleeve 203 and held in position by a check nut 207. The sleeve 206 has a tapered hole therethrough at 208 within which rides the rounded end 209 of a stem 210. This stem 210 is also carried by the tracer casing through a flexible diaphragm 211 which has portions extending freely through perforations 212 through the wall of the sleeve 203 and its outer margin is engaged between a shoulder 214 on the cap 201 and a retaining ring 215. It will be noted that both the sleeve 203 and the stem 210 are thus connected by diaphragms with the tracer casing and are thus capable of rocking in any direction in one plane relative thereto, but that the lever arm between the diaphragm 211, which carries the stem 210 and its outer end 209, is much shorter than the lever arm between the diaphragm 202 and the feeler 204. As shown, when the stem and the sleeve are in their free positions, that is, as normally resiliently held by their respective diaphragms, the rounded end 209 of the stem is centrally disposed within the opening 208 and out of contact with the sides of this opening and the amount of motion permitted before contact takes place may be determined by the axial adjustment of the sleeve 206, the further in this sleeve being moved, the less the lost motion.

The opposite end of the sleeve 203 is provided with an outwardly extending annular flange 220 for a purpose which will later appear. Somewhat inwardly from this flange the sleeve 203 has a straight bore portion 225 against which bears the rounded extremity of a sleeve 226, the opposite end of which is outwardly flanged at 227 and is held against a ring 228 threaded into the enlarged end portion of a cap 230 which is laterally adjustable within the casing 200 by radially arranged screws 2300. The smaller end of this cap 230 has an internal shoulder 231 against which rides the larger end face of a conical element 232. Surrounding this conical element 232 and bearing on its end flange 233, is a helical coil spring 234, the opposite end of which bears against the flange 227. The pressure of this spring against the flange 227 tends to hold the sleeve 226 in position with its axis arranged at right angles to the face of the ring 228 and centering the sleeve 203, but this sleeve 203 may be displaced by pressure exerted against the feeler 204 in any direction in a horizontal plane, this acting to rock the adjacent end of the sleeve 226 and rock the corresponding portion of the flange 227 out of contact with the ring 228 against the pressure of the spring 234. The smaller end of the conical member 232 is formed with a ball portion which rides in a socket 240 in an end closure 241 of a cylindrical bore 242 the outer wall of which is formed by a sleeve 243, and the opposite end wall of which is formed by the enlarged end of the stem 210. The sleeve 243 and the end closure 241 of the stem 210 define a fluid pressure cylinder within which rides a pair of pistons 244 and 245 shown detached in Figure 9. These pistons 244 and 245 are connected in spaced relation by a pair of rods 246 and 247 extending well into the pistons 244 and 245 and secured therein as by screws 248 having their heads seated within the outer ends of the pistons and their shanks threaded into sockets in the ends of the rods 246 and 247. These pistons are thus movable as a unit for a purpose which will later appear. It will be noted that the end closure 241 is essentially a portion of the stem 210 so that the conical member 232 engaging therein and normally held centered by the spring 234 pressing against its base flange 233 tends to center the stem 210 with its outer end 209 centrally disposed with reference to the sleeve 206, and any displacement of the feeler end of the stem 210 by contact with this sleeve 206 as the tracer is displaced, is resisted by the spring 234 which also resists the displacement of the feeler itself. The pistons 244 and 245 provide means for determining whether the direction of traverse of the tracer with reference to the pattern will be clockwise or counterclockwise. A cap 249 closes off the end of the tracer casing remote from the feeler.

The traverse and feed motors 60 and 65 are connected to a pair of valves 250 and 251 in suitable chambers within the tracer casing (Figure 6) and these valves are controlled by either of two mechanisms, the selection of which is determined by the positions of the pistons 244 and 245. The valve 250, which is connected through the ports and pipes 252 and 253 with the traverse motor 60, and has a pressure port and pipe 254 is connected through a forked stem 255 with a pair of bell crank levers 256 and 257 which are fulcrumed as at 258 and 259, respectively, on the flange 220 of the tracer sleeve 203. The valve 251, which has the ports and passages 260 and 261 leading to the feed motor 65 and is connected to the pressure passage 254, is provided with a forked stem 263 which is connected to arms of the two bell crank levers 264 and 265 which are also fulcrumed on the flange 220. Both valves 250 and 251 discharge at their ends, the outer end communicating with the inner end through a passage 266, and the inner end opening into the tracer casing above the diaphragm 202 from which the discharge pipe 267 leads back to the discharge pipe 105. The tracer mechanism is therefore provided with an oil bath. The opposite arm of the bell crank lever 256 is pivoted to the outer end of a stem 270 which extends freely through relatively large holes 271 and 272 through the sleeves 226 and 243, respectively, and has at its inner end an enlarged head 273. The opposite arm of bell crank lever 264 is connected to a similar stem 275 which extends freely through holes through the sleeves 226 and 243 and has a head 280 at its inner end. The heads 280 and 273 and the corresponding stems 270 and 275 are arranged in the same plane and may engage in angularly related grooves 281 and 282 in the inner face of the piston 244 so that when this piston is in depressed condition, shown in Figure 7, these heads are clamped in these respective grooves, and any lateral motion of the inner end of the stem 210 is transmitted through the connected bell crank levers to the valves 250 and 251, thus to control the movements of these valves. Similarly the opposite ends of the bell crank levers 257 and 265 are connected to stems 290 and 291 having heads 292 and 293 at their inner ends which may be engaged in grooves 294 and 295, respectively, on the inner end of the piston 245, so that when the piston 245 is lifted to clamp these heads 292 and 293 they are effective to determine the positioning of the valve 250 and 251 while the heads 273 and 280 are free. As will later more fully appear when one pair of heads is clamped, the direction of tracing motion is clockwise, and when the other set of heads is clamped, the direction of motion is counterclockwise. The position of the pistons 244 and 245 is determined by fluid pressure which is admitted to one or the other ends of the cylinder comprising the sleeve 243 and its end caps, through the ports and pipes 300 and 301, it being understood that when pressure is applied to one end of the cylinder, it is discharged from the other.

The pipes 300 and 301 lead from a valve 305 (see Figures 2) to which the pressure pipe 115 is connected and from which extends a pipe 306 to the discharge pipe 155. The valve 305 is a piston valve having a central cannelure 307 arranged to connect the pressure pipe 115 selectively to either of the pipes 300 and 301, while opening the pipe not so connected to the discharge pipe 306. This valve 307 may be moved to either of its axial positions by the selective energization of a pair of solenoids 308 and 309 controlled from any suitable source through a double actuating switch 310. In some cases it may be desired to re-trace the pattern first in one and then in the opposite direction, particularly as the grinding wheel acts on the work only on one side of a closed path, and where this is desired, a pair of dogs 311 may be secured to the work carriage in position to impinge upon the switch 310 and reverse it at the desired limits of traverse. Where a continuous traverse in one direction is desired, the dogs 311 will be removed and the switch 310 be thrown in the desired traverse direction and allowed to stay there throughout the operation of the machine in which case the return motion of the wheel is idle, being retracted from the work at that time.

In order that the speed of traverse may be regulated as desired, the pipes 252, 253 and 260 and 261 have interposed therein an adjustable throttle valve 320, this valve having a series of tapered cannelures therein, one for each of these passages, to more or less throttle the passage of the fluid, depending upon the axial position of the valve, which may be controlled by adjusting an actuating handle 321 to the desired position along a graduated scale 322.

Figure 3:
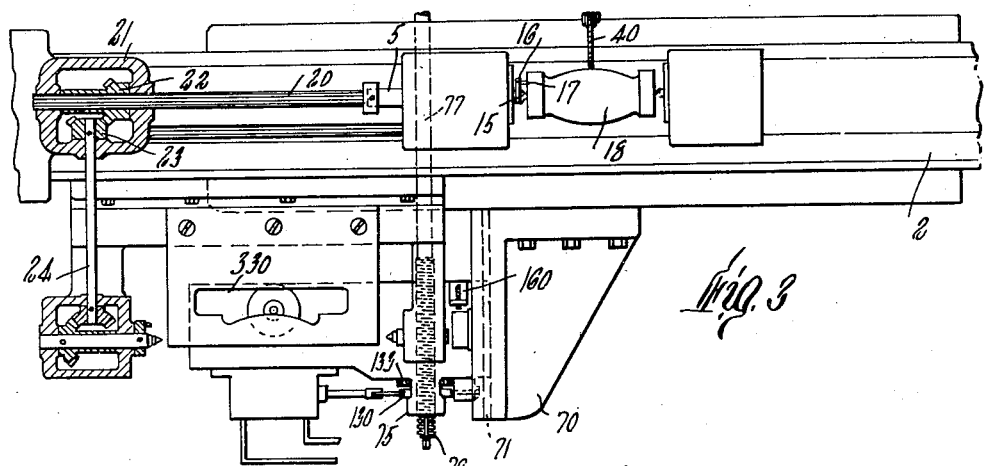
Figure 3 is a view similar to a portion of Figure 2, but showing a modification.

While as shown in Figure 2, the pattern may be rotated to bring various portions of its contour into controlling relation to the tracer mechanism, a plane non-rotating pattern can be employed, if desired, as shown in Figure 3, in which the pattern contour is cut in a plate 330. In this case there will be no occasion for using the pattern rotating means shown in this Figure and also in Figure 2 comprising the shaft 24 and the rotating mechanism driven thereby. In Figure 3 this rotating mechanism comprises shafts and bevel gears, while in Figure 2 it is shown as shafts and spiral gears.

Figure 14:
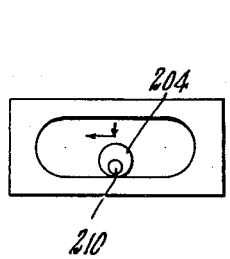

In Figures 10 to 17 there is shown diagrammatically the action of the traverse direction control. In Figures 10 and 14 the parts are shown diagrammatically in relation where the feeler 204 is pressed against the forward edge of the pattern to an extent sufficient to displace the feeler rearwardly out of centered relation but insufficient to have contacted the stem 210, and while the stems 270 and 275 are in clamped condition so as to control the valves 250 and 251. With this arrangement of the parts the upper end of the sleeve 203 carrying the flange 220, and thus the fulcra for the various bell crank levers, is moved forwardly while the stem 210 remains in its central position. The cannelure 350 of the traverse valve 250 is then in position to connect the pressure passage 254 to the pipe 252 while opening the pipe 253 to discharge. This results in moving the carriage to the right, resulting in relative motion of the tracer to the left as shown by the horizontal arrow in Figure 14. At the same time the feed valve 251 is in such position that its cannelure 351 connects the pressure pipe 254 to the pipe 260, thus pressing the work and pattern rearwardly until the stem element 209 is contacted and moved, but as the fulcrum point of this member is much nearer to this end of the feeler than is the fulcrum 202 of the feeler-carrying element, the opposite end of the element 210 moves in the same or forward direction as the flange 220 but at a much faster rate, causing the inner end of the stem 210 to move faster than the flange 220 into the position relative thereto shown in Figure 11. This relationship between the flange 220 and the inner end of the stem 210 results in the valve 250 remaining substantially in the position of Figure 10, as shown in Figure 11, but reverses the port connections from the feed valve 251, introducing pressure into the pipe 261 and resulting in a reverse feed motion in a direction to retract the pattern 2 from the feeler until the condition of Figures 10 to 14 is approached, at which time the feed is again reversed to feed the pattern against the feeler. This causes a rapid in and out feed motion which is so rapid that it is not noticeable in the effect of the tool on the work, but the tracing continues in the same or clockwise direction. When the feeler approaches the left end portion of the work, the rapid in and out motion then becomes transferred from the feed motor to the traverse motor, the feed motor continuing to feed in the same direction as before. The direction of motion takes place continuously clockwise throughout the complete circuit of the pattern contour. The change-over from the small in and out motions between the feed and traverse motors as the tracing proceeds is more fully shown and described in my application Serial No. 584,003, to which reference has been made.

Similarly Figures 12, 13 and 16 and 17 show the respective positions of the valves when the stems 290 and 291 are made effective to control the valves in place of the stems 270 and 275. It will be noted that while the forward edge of the pattern is being traced, the direction of the traverse motor 60 is reversed from that shown in Figures 10 and 11, the pressure being directed to the pipe 252 while the feed motor is rapidly reversed as previously. It will be seen, however, that the direction of tracing is reversed from that shown in Figures 10, 11, 14 and 15, being counterclockwise.

From the foregoing description of certain embodiments of this invention, it should be evident to those skilled in the art that further changes and modifications might be made without departing from its spirit or scope.

I claim:

1. In combination with a pattern, a tracer for traversing said pattern, relatively movable supports for said pattern and tracer, one of said supports carrying a work piece, a tool carried by the other of said supports, means for relatively moving said supports, means controlled by pressure exerted on said tracer by said pattern in response to changes of contour of said pattern for controlling said moving means to move said tracer and pattern relatively to cause said tracer to trace around said pattern in one circuit direction, means controlled by pressure exerted on said tracer by said pattern in response to change of contour of said pattern for moving said tracer and pattern relatively to cause said tracer to trace said pattern in the opposite circuit direction, and means for holding either selected of said controlled means in operative condition allowing the other of said controlled means to be inoperative.

2. In combination with a pattern, a tracer for traversing said pattern, relatively movable supports for said pattern and tracer, one of said supports carrying a work piece, a tool carried by the other of said supports, means for relatively moving said supports, means including levers controlled by pressure exerted on said tracer by said pattern in response to changes of contour of said pattern for controlling said moving means to move said tracer and pattern relatively in one circuit direction, means including levers controlled by pressure exerted on said tracer by said pattern in response to change of contour of said pattern for moving said tracer and pattern relatively in the opposite circuit direction, and means for clamping the levers of either selected one of said control means for operative motion while allowing the levers of the other of said control means to fail to function, thereby selecting the direction of said relative motion.

3. In combination with a pattern, a tracer having a movable feeler for tracing said pattern, relatively movable supports for said pattern and tracer, one of said supports carrying a work piece, a tool carried by the other of said supports, means for relatively moving said supports, a pair of hydraulic motors operatively connected to said supports for producing such tracing by relative motion of said supports, a pair of valves for controlling such motors, a pair of sets of linkages between said tracer, feeler and valves, one of said sets of linkages actuating said valves in response to relative motion between said tracer and feeler and said tracer relative to said pattern in response to changes of contour of said pattern to cause tracing of said pattern by said feeler in clockwise direction and the other of said sets of linkages actuating said valves in response to motion of said feeler relative to said tracer and said tracer relative to said pattern in response to changes of contour of said pattern to cause tracing of said pattern by said feeler in counterclockwise direction, and means for locking either selected of said sets of linkages to said feeler and releasing the other set of linkages therefrom.

4. In combination with a pattern, a tracer having a movable feeler for tracing said pattern, relatively movable supports for said pattern and tracer, one of said supports carrying a work piece, a tool carried by the other of said supports, means for relatively moving said supports, a pair of hydraulic motors operatively connected to said supports for producing such tracing by relative motion of said supports, a pair of valves for controlling such motors, a pair of sets of linkages between said tracer, feeler and valves, one of said sets of linkages actuating said valves in response to relative motion between said tracer and feeler and said tracer relative to said pattern in response to changes of contour of said pattern to cause tracing of said pattern by said feeler in clockwise direction and the other of said sets of linkages actuating said valves in response to motion of said feeler relative to said tracer and said tracer relative to said pattern in response to changes of contour of said pattern to cause tracing of said pattern by said feeler in counterclockwise direction, each of said linkages from each valve having a head, fluid pressure actuated means effective to clamp the heads of one set of linkages to said feeler while releasing the heads of the other set of linkages therefrom, and means for controlling said fluid pressure actuated means.

5. In combination with a pattern, a tracer having a movable feeler for tracing said pattern, relatively movable supports for said pattern and tracer, one of said supports carrying a work piece, a tool carried by the other of said supports, means for relatively moving said supports, a pair of hydraulic motors operatively connected to said supports for producing such tracing by relative motion of said supports, a pair of valves for controlling such motors, a pair of sets of linkages between said tracer, feeler and valves, one of said sets of linkages actuating said valves in response to relative motion between said tracer and feeler and said tracer relative to said pattern in response to changes of contour of said pattern to cause tracing of said pattern by said feeler in clockwise direction and the other of said sets of linkages actuating said valves in response to motion of said feeler relative to said tracer and said tracer relative to said pattern in response to changes of contour of said pattern to cause tracing of said pattern by said feeler in counterclockwise direction, means for locking either selected of said sets of linkages to said feeler and releasing the other set of linkages therefrom, and means effective after a predetermined extent of tracing of said pattern by said feeler in one direction to release the set of linkages previously effective and render effective the set of linkages previously ineffective to periodically reverse the tracing direction.

6. In combination, a pattern, a tracer having a movable feeler for traversing said pattern, relatively movable supports for said pattern and tracer, one of said supports carrying a work piece, a tool carried by the other of said supports, means for relatively moving said supports, means controlled by pressure exerted on said feeler by said pattern in response to changes of contour of said pattern to controlling said moving means to cause said tracer to move around said pattern in either circuit direction, and means operative when said tracer reaches predetermined tracing positions relative to said pattern to reverse the direction of tracing to cause said tracer to trace back and forth against a selected portion only of the pattern contour.

7. In combination, a work holder, a grinding wheel, means supporting said wheel for motion to cause its grinding edge to traverse work carried by said work holder, a pattern having an edge portion shaped to the desired contour of the work, a tracer mechanism having a feeler movable relative thereto, means causing said feeler to trace said pattern edge portion, means for truing said wheel, means for retracting said tracer from said pattern edge by the amount of truing, and means controlled by the relative motions between said feeler and tracing mechanism during the tracing action to move said wheel support and work holder similar to the motion between said pattern and tracer mechanism to cause said wheel edge to cut the work in accordance with the contour of said pattern edge.

8. In combination, a work holder, a grinding wheel, means supporting said grinding wheel for motion to cause its grinding edge to traverse work carried by said work holder, means for feeding said grinding wheel supporting means toward the work, a wheel truing mechanism carried by said wheel supporting means and movable thereon toward and from said wheel, a pattern having an edge portion shaped to the desired contour of the work, a tracer having a pattern feeler, means causing said feeler to trace said pattern edge portion, and means controlled by the relative motions between said tracer and pattern during the tracing to actuate said wheel to cut the work in accordance with said pattern edge portion, and means interconnecting said grinding wheel supporting means, said wheel truing mechanism, and tracer causing the relative motions between said truing device and wheel for the wheel truing operation to move said tracer mechanism by a corresponding amount relative to said pattern and causing the resulting motion between said tracer and feeler to advance said tracer toward said pattern edge and said grinding wheel relative to the work.

9. In combination, a work holder, a grinding wheel, means supporting said grinding wheel for motion from and toward work carried by said work holder, means for so moving said grinding wheel, means for moving said grinding wheel and work holder relatively at a right angle to said from-and-toward motion, a wheel truing mechanism carried by said grinding wheel supporting means and movable thereon toward and from said wheel in the direction of said from-and-toward motion, a pattern having an edge portion shaped to the desired contour of the work, a tracer mechanism having a movable feeler engageable with said edge portion, said mechanism being connected to said grinding wheel to move therewith, means causing the said right angle relative motion between said grinding wheel and work holder to produce similar motion between said tracer mechanism and said pattern, means controlled by changing relations between said feeler and tracer mechanism as said feeler traces said pattern edge to actuate said two moving means to cause said feeler to trace said pattern edge and said wheel to cut the work to the contour of said pattern edge, means actuable to move said truing device against said wheel to true said wheel, and means for adjusting said tracer mechanism by the same amount from said pattern edge and causing the resultant motion between said feeler and mechanism to return said tracer mechanism and said wheel by the amount of truing toward said pattern edge and work, respectively.

10. In combination, a work holder, a grinding wheel, means supporting said grinding wheel for motion from and toward work carried by said work holder, means for so moving said grinding wheel, means for moving said grinding wheel and work holder relatively at a right angle to said from-and-toward motion, a wheel truing mechanism carried by said grinding wheel supporting means and movable thereon toward and from said wheel in the direction of said from-and-toward motion, a pattern having an edge portion shaped to the desired contour of the work, a tracer mechanism having a movable feeler engageable with said edge portion, said mechanism being connected to said grinding wheel to move therewith, means causing the said right angle relative motion between said grinding wheel and work holder to produce similar motion between said tracer mechanism and said pattern, means controlled by changing relations between said feeler and tracer mechanism as said feeler traces said pattern edge to actuate said two moving means to cause said feeler to trace said pattern edge and said wheel to cut the work to the contour of said pattern edge, means actuable to move said truing device against said wheel to true said wheel, parts comprising a piston valve and a ported sleeve enclosing said valve, one of said parts being operatively connected to said truing device, and operative connections of the other part to said tracer mechanism, a fluid pressure piston and cylinder, one carried by said grinding wheel supporting means and the other carried by said operative connections, and fluid connections between said valve and cylinder, the said valve and sleeve having ports cooperating to admit fluid pressure to said cylinder to retract said tracer mechanism from said pattern by the amount of advancement of said device against said wheel to compensate for wheel wear and truing in the from-and-toward position of said tracer relative to said pattern.

WILLIAM L. TANCRED.

REFERENCES CITED

The following references are of record in the file of this patent:

UNITED STATES PATENTS

| Number | Name | Date |
|---|---|---|
| 1,588,856 | Shaw | June 15, 1926 |
| 1,952,230 | Anderson | Mar. 27, 1934 |
| 2,036,362 | Sassen et al. | Apr. 7, 1936 |
| 2,111,271 | Nenninger | Mar. 15, 1938 |